UNITED STATES PATENT OFFICE.

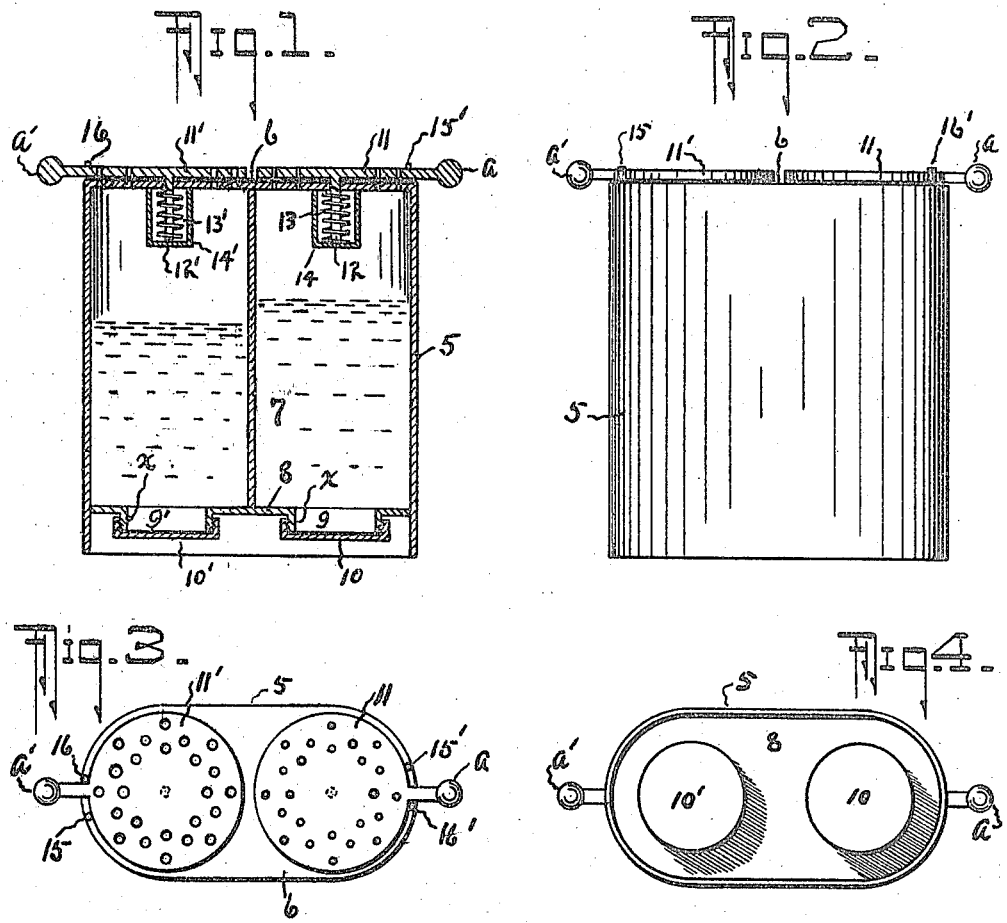

THEODORE H. MALM, OF LOOMIS, NEBRASKA.

SPICE-CONTAINER.

1,234,366.

Specification of Letters Patent.  Patented July 24, 1917.

Application filed December 16, 1916. Serial No. 137,421.

*To all whom it may concern:*

Be it known that I, THEODORE H. MALM, citizen of the United States, residing at Loomis, in the county of Phelps and State of Nebraska, have invented certain new and useful Improvements in Spice-Containers, of which the following is a specification.

This invention relates to a combined salt-and-pepper shaker or spice container, and has for its object to provide normally closed sanitary compartments which may be readily filled with salt, pepper or granulated spices, and so arranged that the contents may be suitably distributed when the container is inverted and shaken.

With the above objects in view and others to be hereinafter explained, the invention consists of the novel construction, combination and arrangement of parts, as described herein and claimed and as illustrated in the drawing, wherein,—

Figure 1 is a longitudinal section of the device through its middle. Fig. 2 is a view of the same in side elevation. Fig. 3 is a plan view of the device. Fig. 4 is a bottom plan view.

Referring now to the drawing for a more particular description, in which corresponding indicating characters refer to similar parts, numeral 5 indicates a casing having a perforated top 6, also having a partition 7 extending longitudinally thereof to provide two compartments. The bottom 8 is provided with two flanged apertures 9 and 9' with caps 10 and 10' threaded thereon. The container may be conveniently filled with salt and pepper or spices through these apertures upon the removal of the caps.

Mounted on the top 6 are two disks 11 and 11' having small apertures which may register, at times, with certain other small apertures which are formed in the top 6. By rotating the disks until their apertures and the apertures in the top 6 are disposed in register, passageways for the contents are provided.

The disks are provided with pivot pins 12 and 12' which extend through the cover. Numerals 13 and 13' indicate coiled springs, each having its respective ends mounted on one of the pivots, its opposite end being connected with the top 6.

These springs normally maintain the apertures of the top 6 in non-alinement with the apertures of the disks, so that the contents of the container will be confined therein.

The springs are inclosed by housings 14 and 14' to prevent the contents of the compartments from interfering with the mechanism. The disks are provided with thumb-pieces $a$ and $a'$, and when pressure is manually applied thereto, the disks may rotate a distance limited by the lugs 15 and 15' with which they may make contact, and when this operation is complete, the apertures in the disks and top 6 will be in register; and when the pressure is removed, the disks will rotate in a reverse direction by action of the springs until the disks make contact with the pins 16 and 16', at which time the apertures in the top 6 will be covered by the disks so that the granulated contents will not pass therethrough.

The coiled springs, when contracted, operate to cause a pressure of the disks on the top 6, the contact being such that circulation of air will be practically prevented, this feature obviously being of advantage, and particularly of advantage to prevent moisture of the air from entering the compartments. In this connection it may be stated that the mounting of the springs is such that the disks are at all times pressed upon the top of the casing, and that the operation of partly rotating the disks causes contraction of the springs.

It will be noted that the bottom 8 of the casing is mounted between the ends of its side wall, and that the flanges $x$ which form the threaded mounting for the caps 10 and 10' are disposed within the plane of the casing, so that the caps will not become worn and will not become detached from the flanges, except when manually rotated for the purpose of filling the compartments with the salt and pepper or with spices, as may be required.

Having fully described my invention, what I claim and desire to secure by Letters Patent is,—

In combination with a two-part, cylindrical casing having a top provided with apertures and provided between its ends with a bottom having a pair of intake ports, each circumscribed by an annular flange, a cap removably mounted on each annular flange, a pair of apertured disks each provided centrally with a pivot-pin, said disks being disposed adjacent to each other with their pivot-pins traversing the apertured top of the casing, their apertures normally being in non-register with the apertures of said top, spiral springs engaging the disks and said casing, said disks being rotatable against the force of the springs to dispose their apertures in register with the apertures of the top of said casing, and means to normally cause a pressure of the disks upon the apertured top of the casing.

In testimony whereof, I have affixed my signature in presence of two witnesses.

THEODORE H. MALM.

Witnesses:
 HIRAM A. STURGES,
 C. DONOVAN.